(12) United States Patent
Kamio

(10) Patent No.: US 10,121,265 B2
(45) Date of Patent: Nov. 6, 2018

(54) IMAGE PROCESSING DEVICE AND METHOD TO CALCULATE LUMINOSITY OF AN ENVIRONMENTAL LIGHT OF AN IMAGE

(71) Applicant: SONY CORPORATION, Tokyo (JP)

(72) Inventor: Kazunori Kamio, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 274 days.

(21) Appl. No.: 14/641,628

(22) Filed: Mar. 9, 2015

(65) Prior Publication Data

US 2015/0279119 A1 Oct. 1, 2015

(30) Foreign Application Priority Data

Mar. 25, 2014 (JP) ................. 2014-061282

(51) Int. Cl.
*G06T 11/00* (2006.01)
*G06T 11/60* (2006.01)
*G06T 5/00* (2006.01)

(52) U.S. Cl.
CPC ............ *G06T 11/001* (2013.01); *G06T 5/007* (2013.01); *G06T 11/60* (2013.01)

(58) Field of Classification Search
None
See application file for complete search history.

(56) References Cited

U.S. PATENT DOCUMENTS 8,751,949 B2 * 6/2014 Hammoud ............ G06F 3/0488
345/159

FOREIGN PATENT DOCUMENTS

| JP | 2008-158399 A | 7/2008 |
| JP | 2010-135996 A | 6/2010 |
| JP | 2011-029691 A | 2/2011 |
| JP | 2012-138819 A | 7/2012 |

OTHER PUBLICATIONS

Chen, Hanfeng, et al. "Backlight local dimming algorithm for high contrast LCD-TV." Proc. of ASID. vol. 6. 2006.*
Nam, Hyoungsik. "A color compensation algorithm to avoid color distortion in active dimming liquid crystal displays." IEEE Transactions on Consumer Electronics 56.4 (2010).*
Moughamian, "Creative Lighting Effects with Adobe Photoshop CS6", published on Apr. 23, 2012, retrieved from http://www.adobepress.com/articles/printerfriendly/1860949 on Mar. 19, 2018.*

* cited by examiner

*Primary Examiner* — Zhengxi Liu
(74) *Attorney, Agent, or Firm* — Chip Law Group

(57) ABSTRACT

An image processing device includes a calculation unit which calculates a luminosity of an environmental light of an image for each region based on an overall average value which is an average value of the luminosity of all pixels forming the image of an object and region average values which are the average values of the luminosity of the pixels for each region that is obtained by dividing the image, and a generation unit which generates a virtual captured image which is an image of the object when the object is illuminated with light from a predetermined position based on the luminosity of the environmental light for each of the regions of the image that is calculated by the calculation unit and the image.

12 Claims, 12 Drawing Sheets

FIG. 5
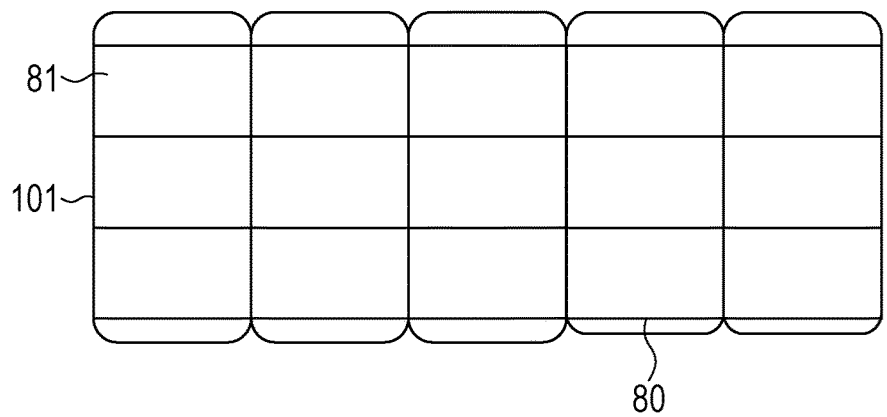
FIG. 6
| | DURING MONOTONIC VARIATION | DURING CONCAVE OR CONVEX VARIATION | DURING COMPLEX VARIATION |
|---|---|---|---|
| CHANGE IN AVERAGE VALUE | ↘↘↘ | ↘↘ / ↗↗ | ↘↗↘↗ |
| GAIN CORRECTION AMOUNT | 1 | 0.5 | 0 |
FIG. 7
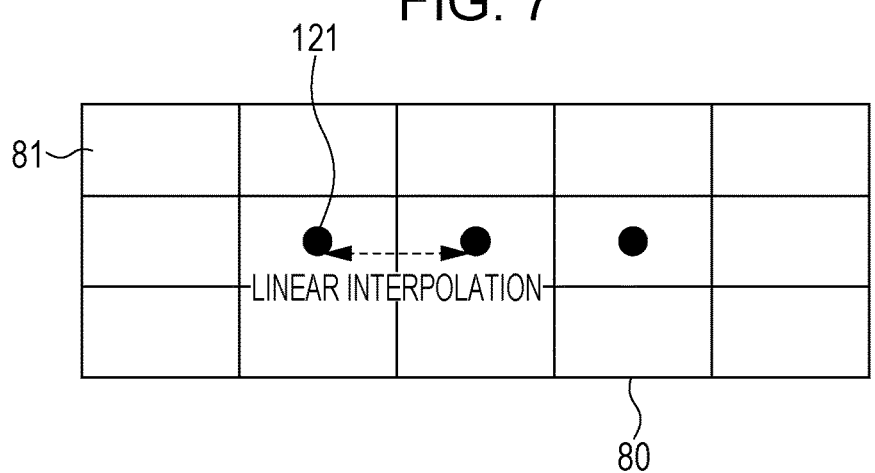

131

132

133

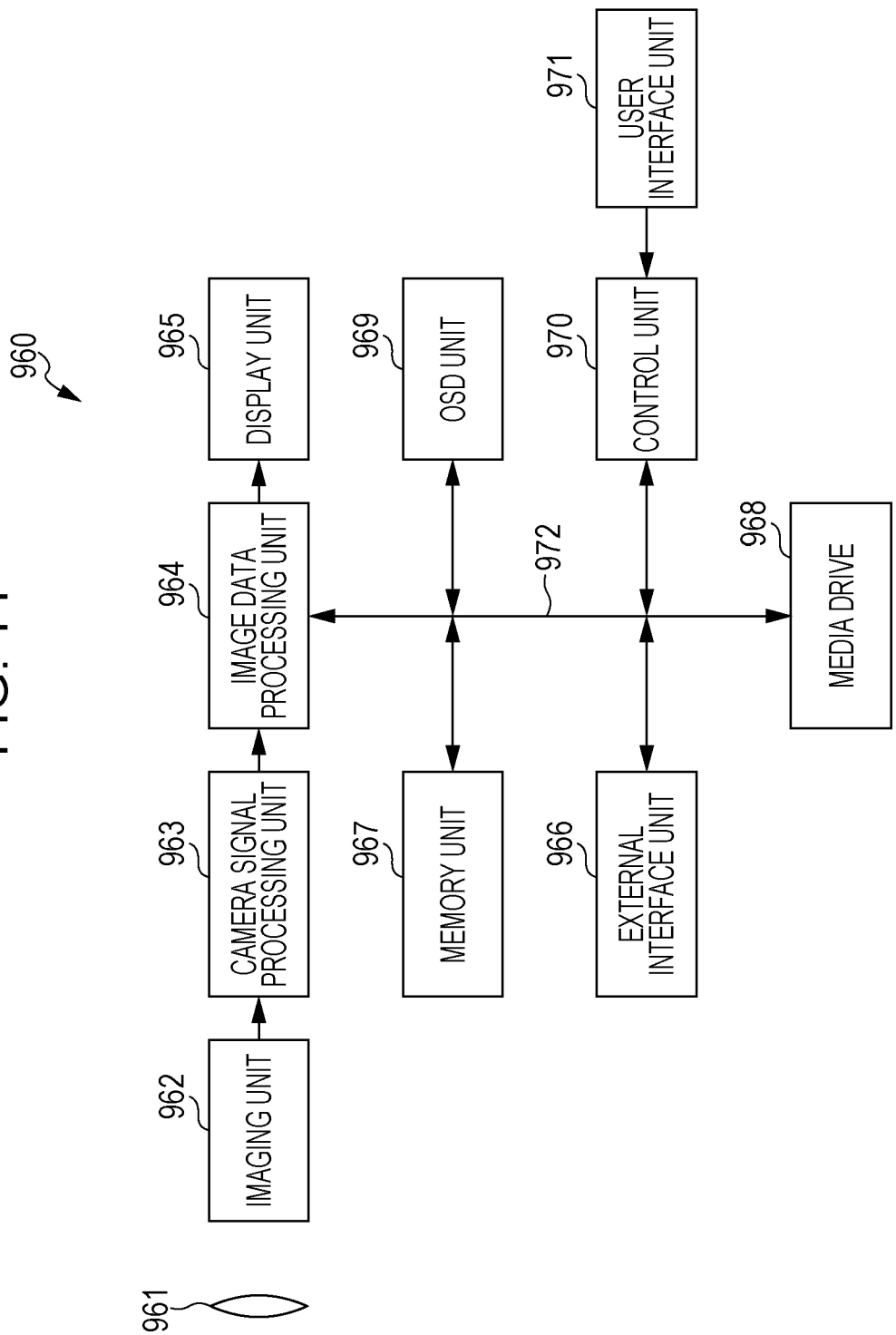

IMAGE PROCESSING DEVICE AND METHOD TO CALCULATE LUMINOSITY OF AN ENVIRONMENTAL LIGHT OF AN IMAGE

CROSS REFERENCE TO RELATED APPLICATIONS

This application claims the benefit of Japanese Priority Patent Application JP 2014-061282 filed Mar. 25, 2014, the entire contents of which are incorporated herein by reference.

BACKGROUND

The present disclosure relates to an image processing device, an image processing method and a program. In particular, the present disclosure relates to an image processing device, an image processing method and a program, each of which enables the controlling of lighting of an image with little computation.

In recent years, various technologies have been designed for editing an image after the image is captured. For example, technology for editing the luminosity of an image after the image is captured has been designed (for example, refer to Japanese Unexamined Patent Application Publication No. 2008-158399). Technology for editing the angle of view of an image after the image is captured (for example, refer to Japanese Unexamined Patent Application Publication No. 2011-29691), technology for combining a plurality of images after the images are captured (for example, refer to Japanese Unexamined Patent Application Publication No. 2012-138819), technology for controlling the lighting (light source) after an image is captured (for example, refer to Japanese Unexamined Patent Application Publication No. 2010-135996), and the like have been designed.

SUMMARY

However, only methods that are performed with much computation such as a method of processing using a plurality of images, or a method of processing by carrying out high performance image analysis have been designed as methods for controlling the lighting of an image after the image is captured.

It is desirable to enable the control of the lighting of an image with little computation.

According to an embodiment of the present disclosure, there is provided an image processing device which includes a calculation unit which calculates a luminosity of an environmental light of an image for each region based on an overall average value which is an average value of the luminosity of all pixels forming the image of an object and region average values which are the average values of the luminosity of the pixels for each region that is obtained by dividing the image, and a generation unit which generates a virtual captured image which is an image of the object when the object is illuminated with light from a predetermined position based on the luminosity of the environmental light for each of the regions of the image that is calculated by the calculation unit and the image.

An image processing method and a program according to an embodiment of the present disclosure correspond to the image processing device of the embodiment of the present disclosure.

In the embodiment of the present disclosure, a luminosity of an environmental light of an image for each region is calculated based on an overall average value which is an average value of the luminosity of all pixels forming the image of an object and region average values which are the average values of the luminosity of the pixels for each region that is obtained by dividing the image, and a virtual captured image which is an image of the object when the object is illuminated with light from a predetermined position is generated based on the luminosity of the environmental light for each of the regions of the image and the image.

According to the embodiment of the present disclosure, it is possible to edit an image. According to the embodiment of the present disclosure, it is possible to control the lighting of an image with little computation.

Note that, the embodiment of the present disclosure is not necessarily limited to the effects described above, and may exhibit any of the effects described in the present disclosure.

BRIEF DESCRIPTION OF THE DRAWINGS

FIG. 5 is a diagram illustrating an example of region groups, for each of which a determination unit of FIG. 1 calculates an average value of region average values;

FIG. 6 is a diagram illustrating gain correction that is performed by the determination unit of FIG. 1;

FIG. 7 is a diagram illustrating the generation of a difference for each pixel of the virtual captured image performed by a conversion unit of FIG. 1;

FIG. 14 is a diagram illustrating a schematic configuration example of an imaging device to which an embodiment of the present disclosure is applied.

DETAILED DESCRIPTION OF EMBODIMENTS

Hereafter, description will be given of the premises of the present disclosure and of embodiments for realizing the present disclosure (hereinafter referred to as "embodiments"). Note that, the description will be given in the following order.

1. First Embodiment: Image Processing Device (FIGS. 1 to 9)
2. Second Embodiment: Computer (FIG. 10)
3. Third Embodiment: Television Device (FIG. 11)
4. Fourth Embodiment: Mobile Telephone (FIG. 12)
5. Fifth Embodiment: Recording and Reproduction Device (FIG. 13)
6. Sixth Embodiment: Imaging Device (FIG. 14)

First Embodiment

Configuration Example of First Embodiment of Image Processing Device

Figure 1:
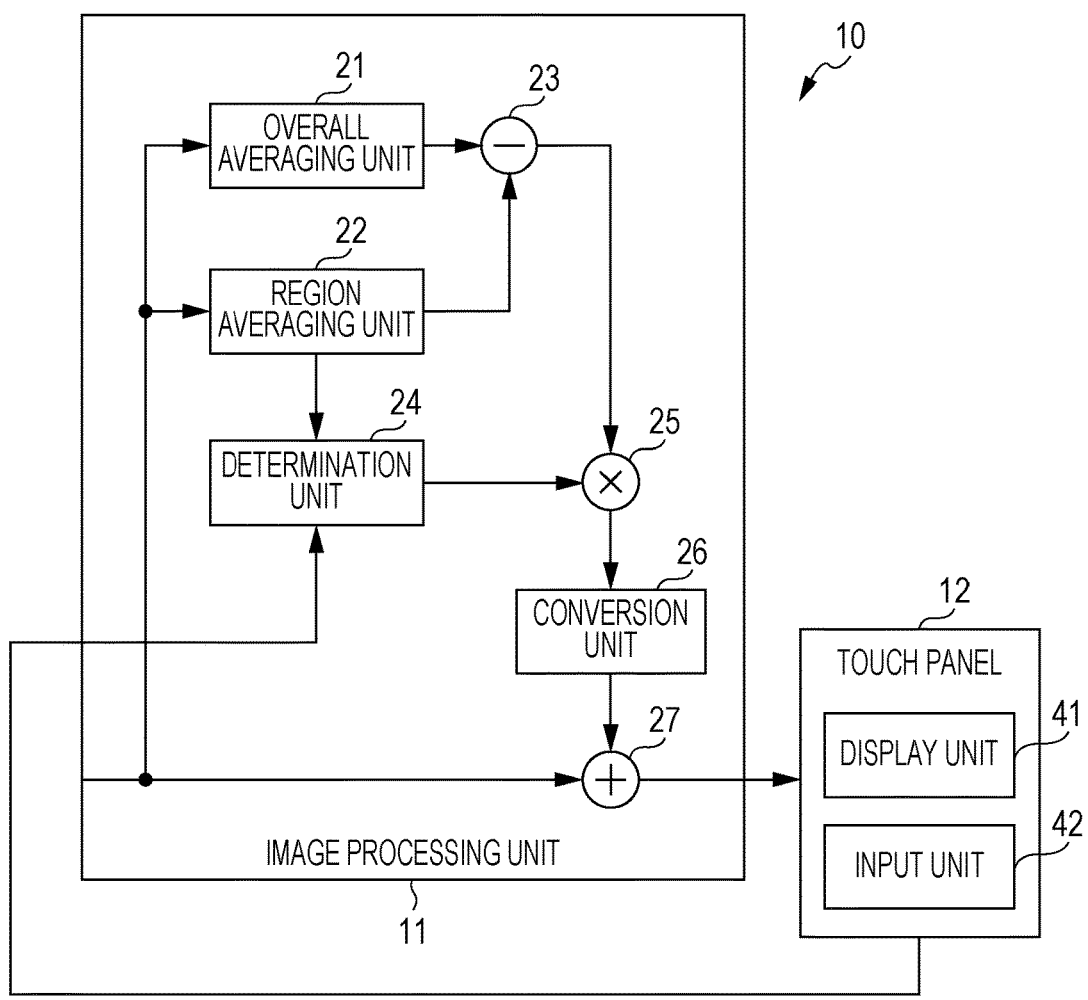
FIG. 1 is a block diagram illustrating a configuration example of an embodiment of an image processing device to which the present disclosure is applied.

FIG. 1 is a block diagram illustrating the configuration example of the first embodiment of the image processing device to which the present disclosure is applied.

An image processing device 10 of FIG. 1 is configured to include an image processing unit 11 and a touch panel 12. The image processing device 10 generates and outputs an image of an object when the object is illuminated with light from a predetermined position as a virtual captured image by controlling the lighting of an image (hereinafter referred to as an input image) of the object that is input from the outside.

Specifically, the image processing unit 11 of the image processing device 10 is configured to include an overall averaging unit 21, a region averaging unit 22, a calculation unit 23, a determination unit 24, a prediction unit 25, a conversion unit 26, and a generation unit 27.

The overall averaging unit 21 of the image processing unit 11 calculates an overall average value, which is the average value of the luminosity of all the pixels that form the input image, and supplies the overall average value to the calculation unit 23.

The region averaging unit 22 divides the input image into a plurality of regions. The region averaging unit 22 calculates region average values, which are the average values of the luminosity of the pixels for each divided region, and supplies the region average values to the calculation unit 23 and the determination unit 24.

The calculation unit 23 calculates the luminosity of the environmental light of the input image based on the overall average value that is supplied from the overall averaging unit 21 and the region average values that are supplied from the region averaging unit 22. Specifically, the calculation unit 23 obtains, for each region, the difference between the region average value of the region and the overall average value, and sets the difference as the luminosity of the environmental light of the input image. The calculation unit 23 supplies the calculated luminosity of the environmental light for each region to the prediction unit 25.

The determination unit 24 acquires light source positional information that indicates the position of the light source from the touch panel 12. The determination unit 24 determines the gain by which to multiply the luminosity of the environmental light that is calculated by the calculation unit 23 based on the light source positional information and the region average values that are supplied from the region averaging unit 22. Note that, the determination unit 24 determines the gain to be 0 when first generating the virtual captured image in relation to the input image.

The determination unit 24 calculates the average value of the region average values of adjacent region groups that are formed of a plurality of regions based on the region average values. The determination unit 24 corrects the gain based on the average value of the region average values of the region groups. The determination unit 24 supplies the post-correction gain to the prediction unit 25.

The prediction unit 25 predicts the difference between the luminosity of the environmental light of the virtual captured image and the luminosity of the environmental light of the input image for each region by multiplying the gain that is supplied from the determination unit 24 with the luminosity of the environmental light for each region of the input image that is supplied from the calculation unit 23. Specifically, the prediction unit 25 uses the value of the product of the gain and the luminosity of the environmental light for each region of the input image as the prediction value of the difference between the luminosity of the environmental light of the virtual captured image and the luminosity of the environmental light of the input image of the region. The prediction unit 25 supplies the predicted difference for each region to the conversion unit 26.

The conversion unit 26 generates a difference for each pixel by subjecting the difference for each region supplied from the prediction unit 25 to linear interpolation, and supplies the differences to the generation unit 27.

The generation unit 27 generates a virtual captured image based on the differences for each pixel that are supplied from the conversion unit 26 and the input image. Specifically, the generation unit 27 adds the difference to the luminosity of the input image and generates the luminosity of the virtual captured image for each pixel. Note that, when the gain is 0, since the difference of each pixel is 0, the virtual captured image is the same as the input image. The generation unit 27 supplies the generated virtual captured image to the touch panel 12.

The touch panel 12 is configured to include a display unit 41 and an input unit 42. The display unit 41 of the touch panel 12 displays the virtual captured image that is supplied from the generation unit 27.

The input unit 42 receives the input of the desired light source position due to a tap operation performed by the user. The input unit 42 supplies the light source positional information indicating the received light source position to the determination unit 24.

Note that, hereinafter, the light source position of the input image and the light source position of the virtual captured image are described as only differing in the horizontal direction in order to facilitate explanation; however, a case in which the light source positions only differ in the vertical direction is the same as the case in which the light source positions only differ in the horizontal direction except in that the horizontal direction is exchanged for the vertical direction. When the light source positions differ in both the horizontal direction and the vertical direction, the processes of the case in which only the horizontal direction differs and the case in which only the vertical direction differs are both performed, and the virtual captured images that are obtained as a result are combined.

Figure 2A:
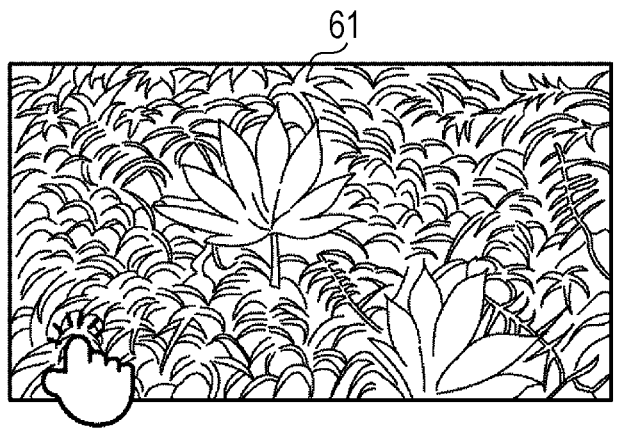
FIGS. 2A to 2C are diagrams illustrating input operations performed by a user to input desired light source positions.
Figure 2B:
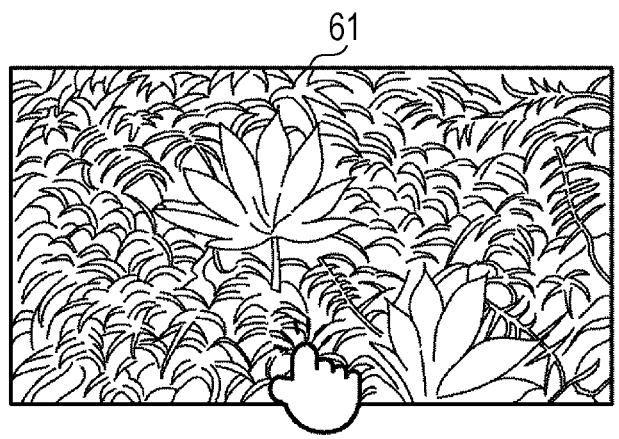
Figure 2C:
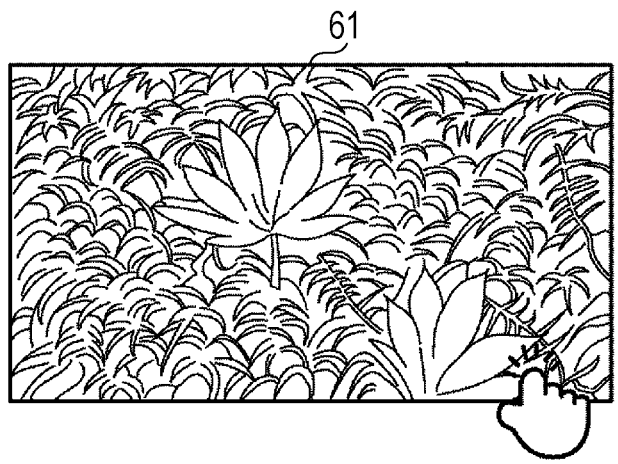

Description of Input Operations Performed by User to Input Desired Light Source Positions FIGS. 2A to 2C are diagrams illustrating input operations performed by a user to input desired light source positions.

When the light source position that is desired by the user is the leftmost position at which the object of the input image can be illuminated, as illustrated in FIG. 2A, the user taps the leftmost position of a virtual captured image 61 being displayed on the display unit 41 using a finger. Accordingly, the input unit 42 receives the input as the desired light source position of the leftmost position at which the object of the input image can be illuminated. The input unit 42 supplies light source positional information indicating the light source position of the leftmost position at which the object of the input image can be illuminated to the determination unit 24. As a result, the display unit 41 is caused to display a virtual captured image that is illuminated with light from the leftmost position at which the object of the input image can be illuminated.

When the light source position that is desired by the user is the center position of a range at which the object of the input image can be illuminated, as illustrated in FIG. 2B, the user taps the center position of the virtual captured image 61 being displayed on the display unit 41 using a finger. Accordingly, the input unit 42 receives the input as the desired light source position of the center position of the range at which the object of the input image can be illuminated. The input unit 42 supplies light source positional information indicating the light source position of the center position of the range at which the object of the input image can be illuminated to the determination unit 24. As a result, the display unit 41 is caused to display a virtual captured image that is illuminated with light from the center position of the range at which the object of the input image can be illuminated.

When the light source position that is desired by the user is the rightmost position at which the object of the input image can be illuminated, as illustrated in FIG. 2C, the user taps the rightmost position of the virtual captured image 61 being displayed on the display unit 41 using a finger. Accordingly, the input unit 42 receives the input as the desired light source position of the rightmost position at which the object of the input image can be illuminated. The input unit 42 supplies light source positional information indicating the light source position of the rightmost position at which the object of the input image can be illuminated to the determination unit 24. As a result, the display unit 41 is caused to display a virtual captured image that is illuminated with light from the rightmost position at which the object of the input image can be illuminated.

As described above, the user inputs the desired light source position by tapping a position in the virtual captured image 61 corresponding to the desired light source position using a finger. Accordingly, the user can control the position of the light source in the virtual captured image displayed on the display unit 41. In other words, it is possible to control the lighting direction of the virtual captured image.

Example of Regions

Figure 3:
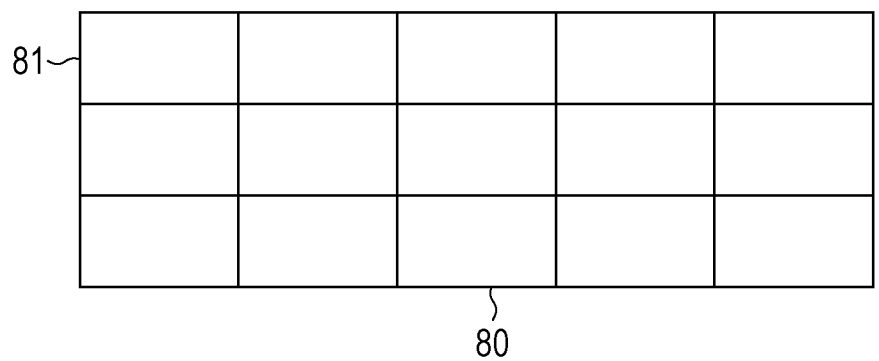
FIG. 3 is a diagram illustrating an example of regions that are divided by a region averaging unit of FIG. 1.

FIG. 3 is a diagram illustrating an example of the regions that are divided by the region averaging unit 22 of FIG. 1.

As illustrated in FIG. 3, the region averaging unit 22 divides an input image 80 into 5×3 regions 81. In this manner, since the region averaging unit 22 divides the input image 80 into relatively large regions 81, the region average values indicate the brightness of a spatial field without indicating a brightness peculiar to the object. Therefore, a value obtained by subtracting the overall average value from the region average value is equivalent to the luminosity of a relative environmental light at the time of capture.

Figure 4:
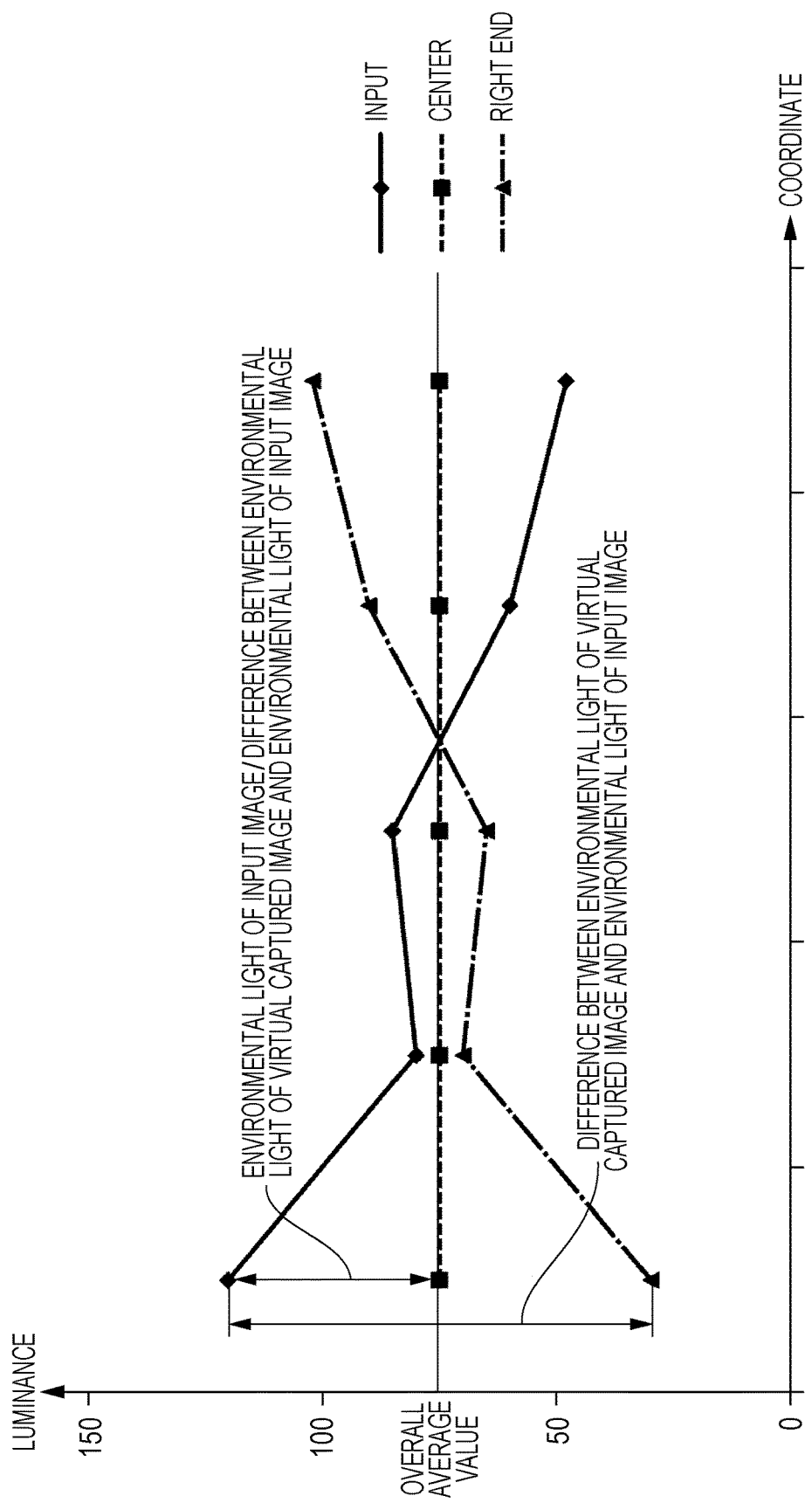
FIG. 4 is a diagram illustrating a prediction of a difference between a luminosity of environmental light of a virtual captured image and a luminosity of environmental light of an input image, that is performed by a prediction unit of FIG. 1.

Description of Prediction of Difference Between Luminosity of Environmental Light of Virtual Captured Image and Luminosity of Environmental Light of Input Image FIG. 4 is a diagram illustrating a prediction of the difference between the luminosity of the environmental light of the virtual captured image and the luminosity of the environmental light of the input image, that is performed by the prediction unit 25 of FIG. 1.

Note that, in FIG. 4, the horizontal axis indicates the coordinate of the position in the horizontal direction of regions 81 that line up in the horizontal direction, and the vertical axis indicates the region average values of the regions 81 and the overall average value. Here, the coordinate of the position in the horizontal direction of the region 81 grows smaller toward the left side.

As illustrated by the thick solid line in FIG. 4, when the region average value of the regions 81 that line up in the horizontal direction of the input image varies to increase the further left the region 81 with a steep inclination, the position of the light source in the input image is estimated to be the leftmost position at which the object can be illuminated. Therefore, when the position indicated by the light source positional information is the center position of the range at which the object of the input image can be illuminated, the determination unit 24 determines the gain to be −1 such that the brightness of the spatial field is uniform.

Note that, when the gain is −1, the prediction value of the difference between the luminosity of the environmental light of the virtual captured image and the luminosity of the environmental light of the input image of each region 81 is the luminosity of the environmental light of the input image of the region 81. Therefore, as illustrated by the thick dotted line in FIG. 4, the luminosity of the environmental light of the virtual captured image of each region 81 is the overall average value of the input image illustrated by the thin solid line. As a result, the brightness of the spatial field of the virtual captured image is uniform. Accordingly, when the position indicated by the light source positional information is the center position of the range at which the object of the input image can be illuminated, the determination unit 24 determines the gain to be −1.

Meanwhile, when the position indicated by the light source positional information is the rightmost position at which the object of the image can be illuminated, the determination unit 24 determines the gain to be −2 such that the luminosity varies to grow brighter toward the right side in the spatial field with a steep inclination. In other words, when the gain is −2, as illustrated by the thick dot-and-dash line of FIG. 4, the luminosity of the environmental light of the virtual captured image of each region 81 is an inversion of the luminosity of the environmental light of the input image that is illustrated using the thick solid line around the overall average value of the input image that is illustrated using the thin solid line. Therefore, the brightness of the spatial field of the virtual captured image varies to grow brighter toward the right side of the spatial field with a steep inclination.

Accordingly, when the position indicated by the light source positional information is the rightmost position at which the object of the image can be illuminated, the determination unit 24 determines the gain to be −2.

As described above, the image processing device 10 predicts the difference between the luminosity of the environmental light of the virtual captured image and the luminosity of the environmental light of the input image based on the position of the light source in the input image and the light source positional information such that the brightness of the spatial field varies according to the variation of the position of the light source.

Example of Region Groups

FIG. 5 is a diagram illustrating an example of region groups, for each of which the determination unit 24 of FIG. 1 calculates an average value of the region average values.

As illustrated in FIG. 5, the determination unit 24 categorizes the 5×3 regions 81 in the input image 80 into a region group 101 for each group of regions 81 with the same position in the horizontal direction. Therefore, the 5×3 regions 81 are categorized into five region groups 101, each of which is formed of 1×3 regions 81.

Description of Gain Correction

FIG. 6 is a diagram illustrating the gain correction that is performed by the determination unit 24 of FIG. 1.

The determination unit 24 calculates the average value of the region average values for each of the region groups 101, and calculates the differences between the average values of the adjacent region groups 101 as feature values. The determination unit 24 corrects the gain based on the variation of the feature values according to the position of the region group 101.

Specifically, as illustrated in FIG. 6, when the average values of the region average values vary in a monotonic manner, that is, when the signs (positive or negative) of the feature values of all of the region groups 101 are the same, since there is a high likelihood that the region average values correctly represent the spatial field, the determination unit 24 determines the gain correction amount to be 1. When the variation in the average value of the region average values is concave or convex variation that forms a parabola, that is, when the signs of the feature values change between the region group 101 of a certain position and the region groups 101 to the left and right sides thereof, the determination unit 24 determines the gain correction amount to be 0.5, which is smaller than when the variation is monotonic.

Furthermore, when the variation in the average value of the region average values is complex variation with no regularity, that is, when the sign of the feature value varies irregularly, since there is a high likelihood that the region average values do not correctly represent the spatial field, the determination unit 24 sets the gain correction amount to 0, which is smaller than when the variation is concave or convex. The determination unit 24 corrects the gain by multiplying the correction amount that is set as described above with the gain.

Note that, the gain correction amount is not limited to the examples of FIG. 6 as long as the value increases in order from when the variation is monotonic, when the variation is concave or convex, and when the variation is complex.

Description of Generation of Difference for Each Pixel of Virtual Captured Image FIG. 7 is a diagram illustrating the generation of the difference for each pixel of the virtual captured image performed by the conversion unit 26 of FIG. 1.

As illustrated in FIG. 7, the conversion unit 26 sets the difference for each region of the virtual captured image to the difference of a pixel 121 of the center of the region. The conversion unit 26 linearly interpolates the difference of the pixels positioned between the pixels 121 using the differences of the pixels 121.

Note that, it is possible to adopt multipoint interpolation, interpolation which smoothes the variation of inflection points, or the like in addition to the linear interpolation as the interpolation that is performed by the conversion unit 26.

Examples of Virtual Captured Image

Figure 8A:
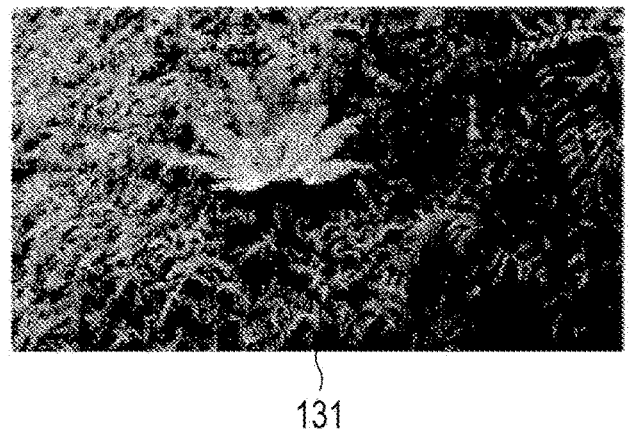
FIGS. 8A to 8C are diagrams illustrating examples of the virtual captured image that is generated by a generation unit of FIG. 1.
Figure 8B:
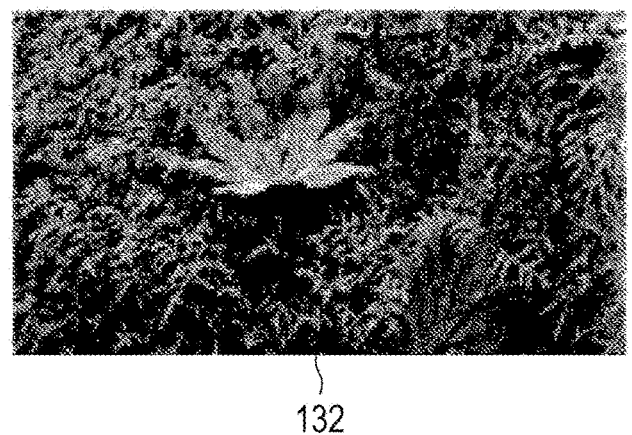
Figure 8C:
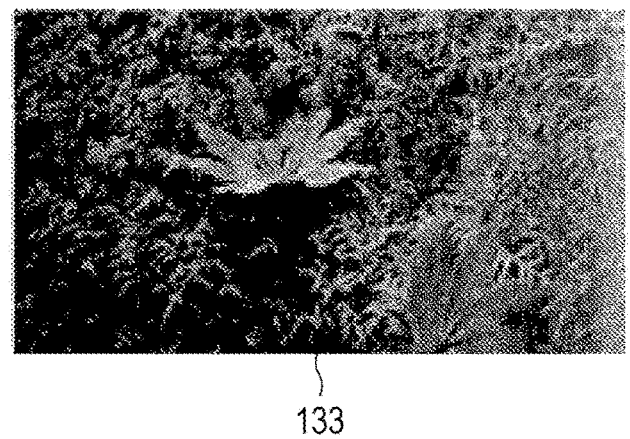

FIGS. 8A to 8C are diagrams illustrating examples of the virtual captured image that is generated by the generation unit 27 of FIG. 1.

As illustrated in FIG. 8A, when the input image that is illuminated with light from the leftmost position at which the object can be illuminated is displayed as a virtual captured image 131, as illustrated in FIG. 2B, when the user taps the center position of the virtual captured image 131 with a finger, as illustrated in FIG. 8B, a virtual captured image 132 that is illuminated with light from the center position of a range at which the object can be illuminated is generated.

Meanwhile, as illustrated in FIG. 2C, when the user taps the rightmost position of the virtual captured image 131 that is being displayed, as illustrated in FIG. 8C, a virtual captured image 133 that is illuminated with light from the rightmost position at which the object can be illuminated is generated.

Description of Processes of Image Processing Device

Figure 9:
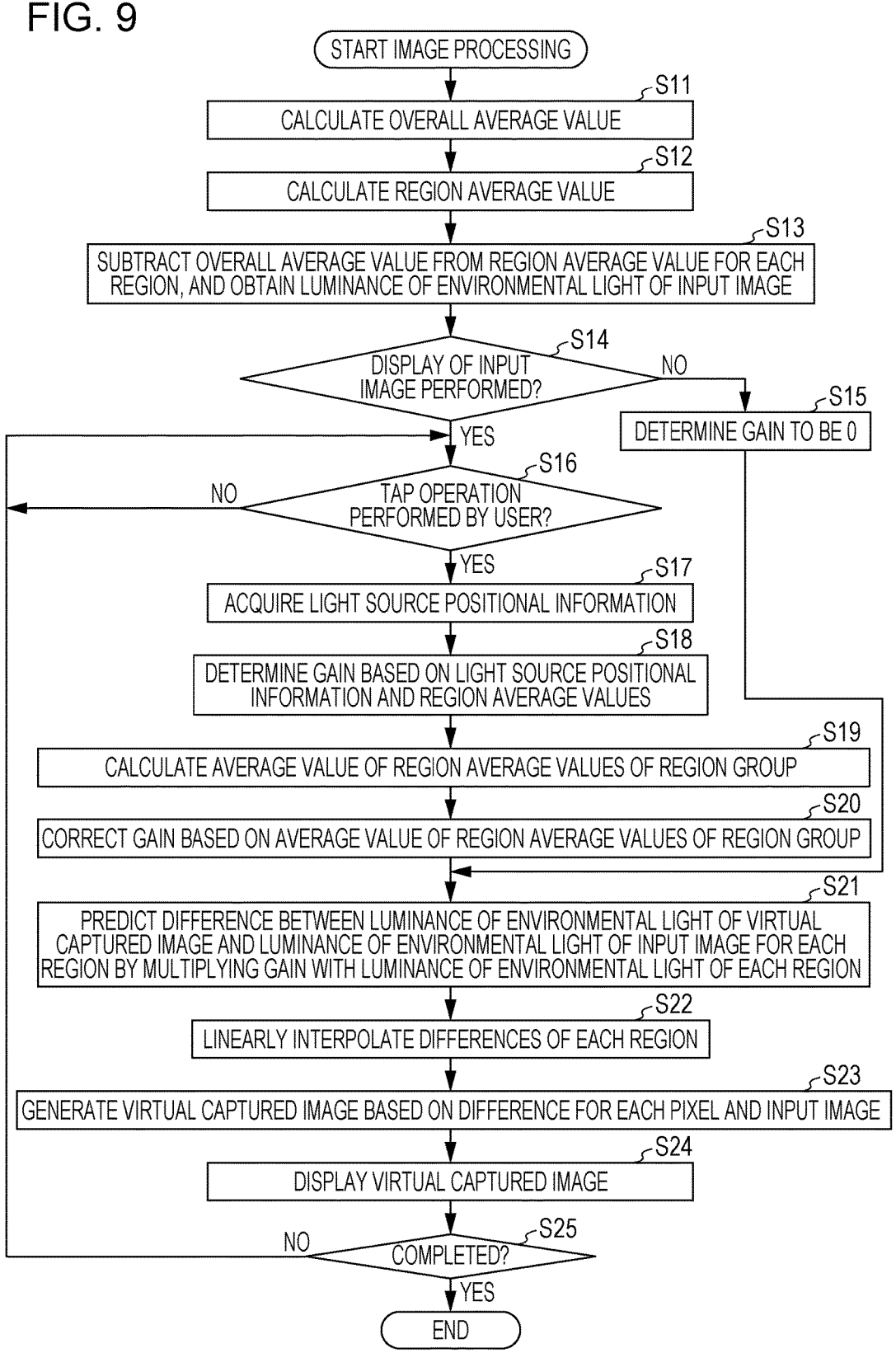
FIG. 9 is a flowchart illustrating image processing of the image processing device of FIG. 1.

FIG. 9 is a flowchart illustrating the image processing of the image processing device 10 of FIG. 1. The image processing is started when the input image is input to the image processing device 10, for example.

In step S11 of FIG. 9, the overall averaging unit 21 of the image processing device 10 calculates the overall average value and supplies the overall average value to the calculation unit 23.

In step S12, the region averaging unit 22 divides the input image into a plurality of regions, calculates the region average values, and supplies the region average values to the calculation unit 23 and the determination unit 24.

In step S13, the calculation unit 23 subtracts the overall average value that is supplied from the overall averaging unit 21 from the region average value that is supplied from the region averaging unit 22 for each region, and obtains the difference that is obtained as a result as the luminosity of the environmental light of the input image. The calculation unit 23 supplies the calculated luminosity of the environmental light for each region of the input image to the prediction unit 25.

In step S14, the determination unit 24 determines whether or not the input image is displayed on the display unit 41 in step S24. In step S14, when it is determined that the input image is yet to be displayed on the display unit 41, that is, when the virtual captured image is yet to be generated in the image processing, the process proceeds to step S15.

In step S15, the determination unit 24 determines the gain to be 0, and the process proceeds to step S21.

Meanwhile, in step S14, when it is determined that the input image has already been displayed on the display unit 41, that is, when the virtual captured image has already been generated in the image processing, the process proceeds to step S16.

In step S16, the input unit 42 determines whether or not the tap operation is performed by the user. When it is determined that the tap operation is not performed by the user in step S16, the input unit 42 waits until the tap operation is performed.

Meanwhile, when it is determined that the tap operation is performed by the user in step S16, the input unit 42 receives the input of the desired light source position according to the tap operation of the user, and supplies light source positional information indicating the received light source position to the determination unit 24.

In step S17, the determination unit 24 acquires the light source positional information from the touch panel 12. In step S18, the determination unit determines the gain to be multiplied by the luminosity of the environmental light that is calculated by the calculation unit 23, based on the light source positional information and region average values.

In step S19, the determination unit 24 calculates the average value of the region average values of the region groups based on the region average values that are supplied from the region averaging unit 22. In step S20, the determination unit 24 corrects the gain based on the average value of the region average values of the region groups. The determination unit 24 supplies the post-correction gain to the prediction unit 25, and the process proceeds to step S21.

In step S21, the prediction unit 25 predicts the difference between the luminosity of the environmental light of the virtual captured image and the luminosity of the environmental light of the input image for each region by multiplying the gain that is supplied from the determination unit 24 with the luminosity of the environmental light for each region of the input image that is supplied from the calculation unit 23. The prediction unit 25 supplies the predicted difference for each region to the conversion unit 26.

In step S22, the conversion unit 26 generates a difference for each pixel by subjecting the difference for each region supplied from the prediction unit 25 to linear interpolation, and supplies the differences to the generation unit 27.

In step S23, the generation unit 27 generates a virtual captured image based on the differences for each pixel that are supplied from the conversion unit 26 and the input image. The generation unit 27 supplies the generated virtual captured image to the touch panel 12.

In step S24, the display unit 41 of the touch panel 12 displays the virtual captured image that is supplied from the generation unit 27. Note that, when the gain is 0, since the virtual captured image is the same as the input image, in the first step S24, the display unit 41 displays the virtual captured image, which is the input image.

In step S25, the image processing device 10 determines whether or not the imaging process is completed. For example, when the user performs a predetermined operation on the touch panel 12 and inputs a command to complete the image processing, the image processing device 10 determines that the image processing is completed in step S25. Meanwhile, when the user does not input the command to complete the image processing, the image processing device 10 determines that the image processing is not completed in step S25.

When it is determined that the image processing is not completed in step S25, the process returns to step S16, and the processes of steps S16 to S25 are performed until the image processing is determined to be completed. Meanwhile, when the image processing is determined to be completed in step S25, the process ends.

As described above, the image processing device 10 calculates the luminosity of the environmental light of the input image for each region based on the overall average value and the region average values, and generates the virtual captured image based on the luminosity and the input image. Therefore, it is possible to control the lighting of the input image with little computation. As a result, for example, it is possible to easily change the position of the light source of a captured image that is captured with back lighting or the like, is dark, and has poor visibility after capture, and improve the visibility.

Note that, in the above description, a case in which the light source position is changed is described; however, it is possible to increase the luminosity of the light source by setting the gain to a value greater than 1, to decrease the luminosity of the light source by setting the gain to a value of 0 or greater and less than 1, and the like.

The image processing device 10 of FIG. 1 is provided with the touch panel 12 in which the display unit 41 and the input unit 42 are integrated; however, the display unit and the input unit may be provided separately. For example, the image processing device 10 may be provided with a display or the like as the display unit, and may be provided with a keyboard, a mouse, a microphone, or the like as the input unit.

When a mouse is used instead of the input unit 42, the user can input the desired light source position by clicking the desired position in the virtual captured image that is displayed on the display unit using the mouse. When a keyboard is used instead of the input unit 42, the user can input the coordinates of the desired light source position, or a command specifying the coordinates of the desired light source position.

The gain may be determined in region units instead of image units.

Second Embodiment

Description of Computer to which Embodiment of Present Disclosure is Applied

At least a portion of the series of processes described above may be executed using hardware such as large scale integration (LSI) and may also be executed using software. When the entire series of processes is executed using software, the program configuring the software is installed on a computer. Here, examples of the computer include a computer embedded within dedicated hardware, and an ordinary personal computer which is capable of executing the various functions due to various programs being installed thereon.

Figure 10:
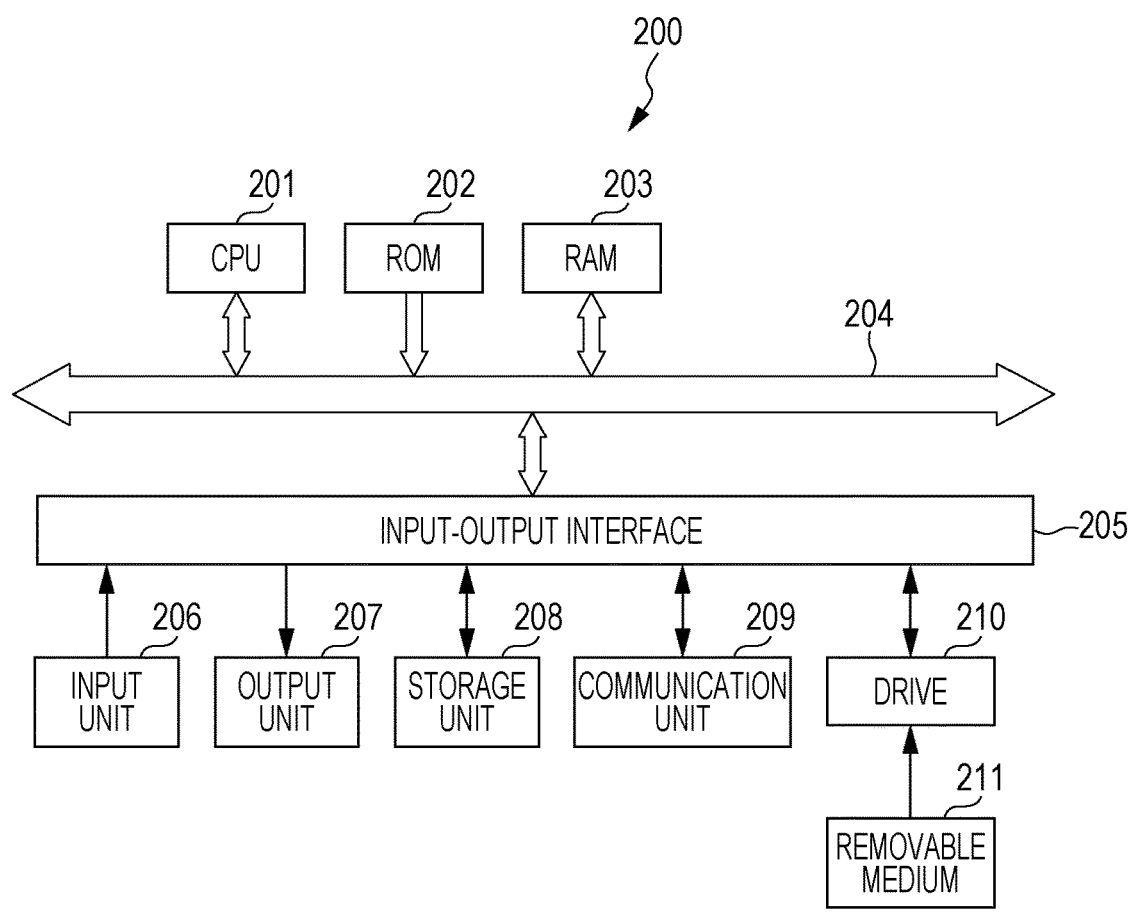
FIG. 10 is a block diagram illustrating an example of the hardware configuration of a computer.

FIG. 10 is a block diagram illustrating a configuration example of the hardware of the computer which executes the series of processes described above using a program.

In a computer 200, a central processing unit (CPU) 201, a read only memory (ROM) 202, and a random access memory (RAM) 203 are connected to each other by a bus 204.

Furthermore, an input-output interface 205 is connected to the bus 204. The input-output interface 205 is connected to an input unit 206, an output unit 207, a storage unit 208, a communication unit 209, and a drive 210.

The input unit 206 is formed of a keyboard, a mouse, a microphone, an input unit of a touch panel, or the like. The output unit 207 is formed of a display, a speaker, the display unit of a touch panel, or the like. The storage unit 208 is formed of a hard disk, a non-volatile memory, or the like. The communication unit 209 is formed of a network interface or the like. The drive 210 drives a removable medium 211 such as a magnetic disc, an optical disc, a magneto-optical disc or semiconductor memory.

In the computer 200 that is configured as described above, the series of processes described above is performed by the CPU 201, for example, loading the program that is stored in the storage unit 208 into the RAM 203 via the input-output interface 205 and the bus 204, and executing the loaded program.

The program executed by the computer 200 (the CPU 201), for example, may be provided by recording the program onto the removable medium 211 as a packaged medium or the like. It is possible to provide the program via a wired or wireless transmission medium such as a local area network, the Internet, or a digital satellite broadcast.

In the computer 200, it is possible to install the program onto the storage unit 208 via the input-output interface 205 by mounting the removable medium 211 into the drive 210. It is possible to receive the program using the communication unit 209 via a wired or wireless transmission medium, and install the program onto the storage unit 208. Additionally, it is possible to install the program beforehand on the ROM 202 or the storage unit 208.

Note that, the program which the computer 200 executes may be a program in which the processes are performed in time series order in the order described in the present specification. The program may be a program in which the processes are performed in parallel or at the necessary timing such as when the process is called.

Third Embodiment

Configuration Example of Television Device

Figure 11:
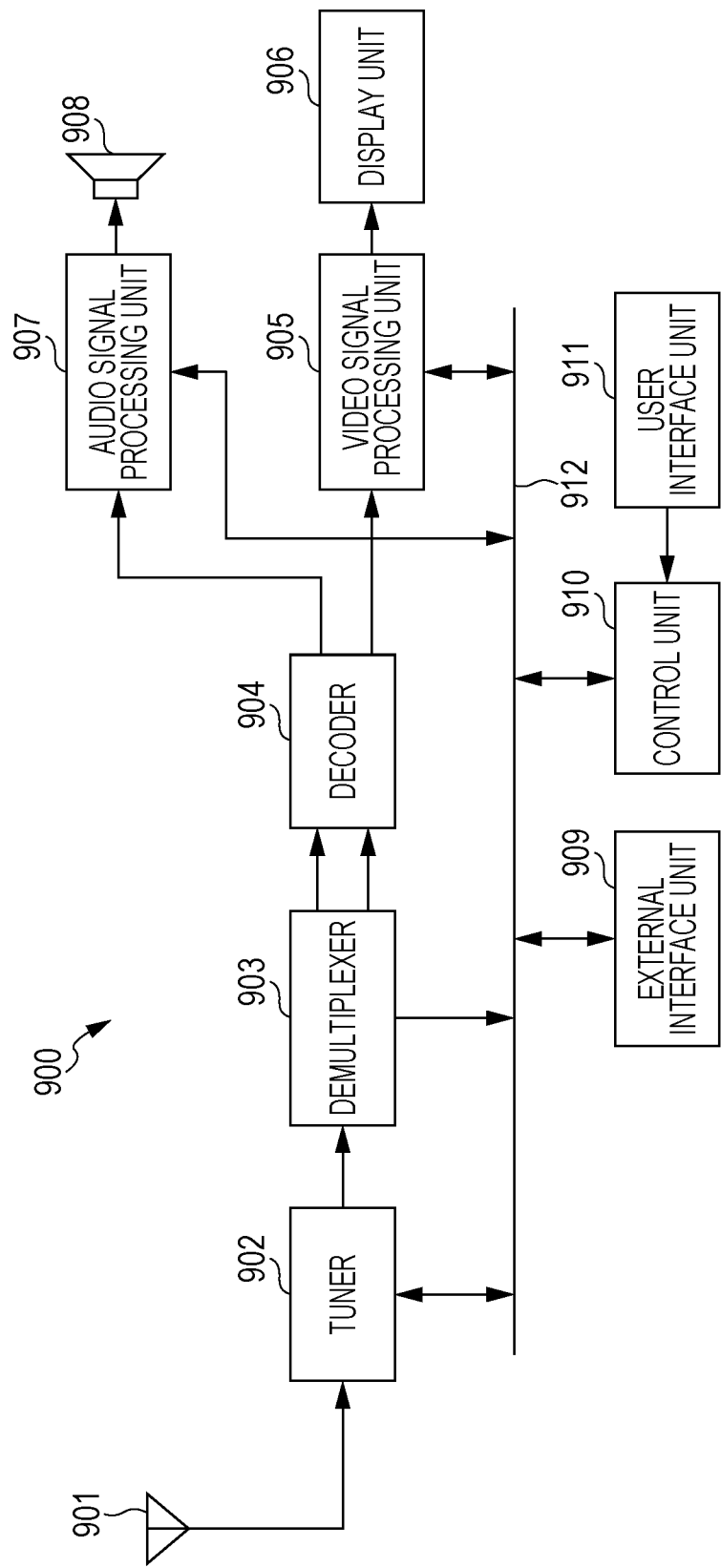
FIG. 11 is a diagram illustrating a schematic configuration example of a television device to which an embodiment of the present disclosure is applied.

FIG. 11 shows an example of the schematic configuration of a television device to which an embodiment of the present disclosure is applied. A television device 900 includes an antenna 901, a tuner 902, a demultiplexer 903, a decoder 904, a video signal processing unit 905, a display unit 906, an audio signal processing unit 907, a speaker 908 and an external interface unit 909. Furthermore, the television device 900 includes a control unit 910, a user interface unit 911 and the like.

The tuner 902 selects a desired channel from a broadcast signal that is received by the antenna 901, performs demodulation, and outputs the encoded bitstream that is obtained to the demultiplexer 903.

The demultiplexer 903 extracts the video and the audio packets of the show, which is the viewing target, from the encoded bitstream, and outputs the packet data that is extracted to the decoder 904. In addition, the demultiplexer 903 supplies packets of data such as an electronic program guide (EPG) to the control unit 910. Note that, when scrambling has been performed, removal of the scrambling is performed by the demultiplexer or the like.

The decoder 904 performs the decoding process of the packets, the video data that is generated by the decoding process is output to the video signal processing unit 905, and the audio data is output to the audio signal processing unit 907.

The video signal processing unit 905 performs noise removal, video processing and the like corresponding to user settings in relation to the video data. The video signal processing unit 905 generates the video data of a show to be displayed on the display unit 906, image data according to a process based on an application that is supplied via the network, and the like. The video signal processing unit 905 generates the video data for displaying a menu screen or the like such as the item selection, and multiplexes the video data into the video data of the show. The video signal processing unit 905 generates a drive signal based on the video data that is generated in this manner, and drives the display unit 906.

The display unit 906 drives display devices (for example, liquid crystal display devices or the like) based on the drive signal from the video signal processing unit 905, and causes the display devices to display the video of the show and the like.

The audio signal processing unit 907 subjects the audio data to a predetermined process such as noise removal, and after the processing, performs audio output by performing a D/A conversion process and an amplification process on the audio data and supplying the result to the speaker 908.

The external interface unit 909 is an interface for connecting to external devices or to a network, and performs data transmission and reception of the video data, the audio data and the like.

The user interface unit 911 is connected to the control unit 910. The user interface unit 911 is configured to include an operation switch, a remote control signal reception unit, and the like, and supplies an operation signal corresponding to a user operation to the control unit 910.

The control unit 910 is configured using a central processing unit (CPU), a memory, and the like. The memory stores the program that is executed by the CPU, the various data that is necessary for the CPU to perform the processes, the EPG data, data that is acquired via the network, and the like. The program that is stored in the memory is read out and executed by the CPU at a predetermined timing such as when the television device 900 starts up. By executing the program, the CPU controls each part such that the television device 900 performs an operation that corresponds to the user operation.

Note that, the television device 900 is provided with the tuner 902, the demultiplexer 903, the video signal processing unit 905, the audio signal processing unit 907, the external interface unit 909 or the like, and a bus 912 for connecting the control unit 910.

In the television device that is configured in this manner, the video signal processing unit 905 is provided with the function of the image processing device (the image processing method) of the present application. Therefore, it is possible to control the lighting of the input image with little computation.

Fourth Embodiment

Configuration Example of Mobile Telephone

Figure 12:
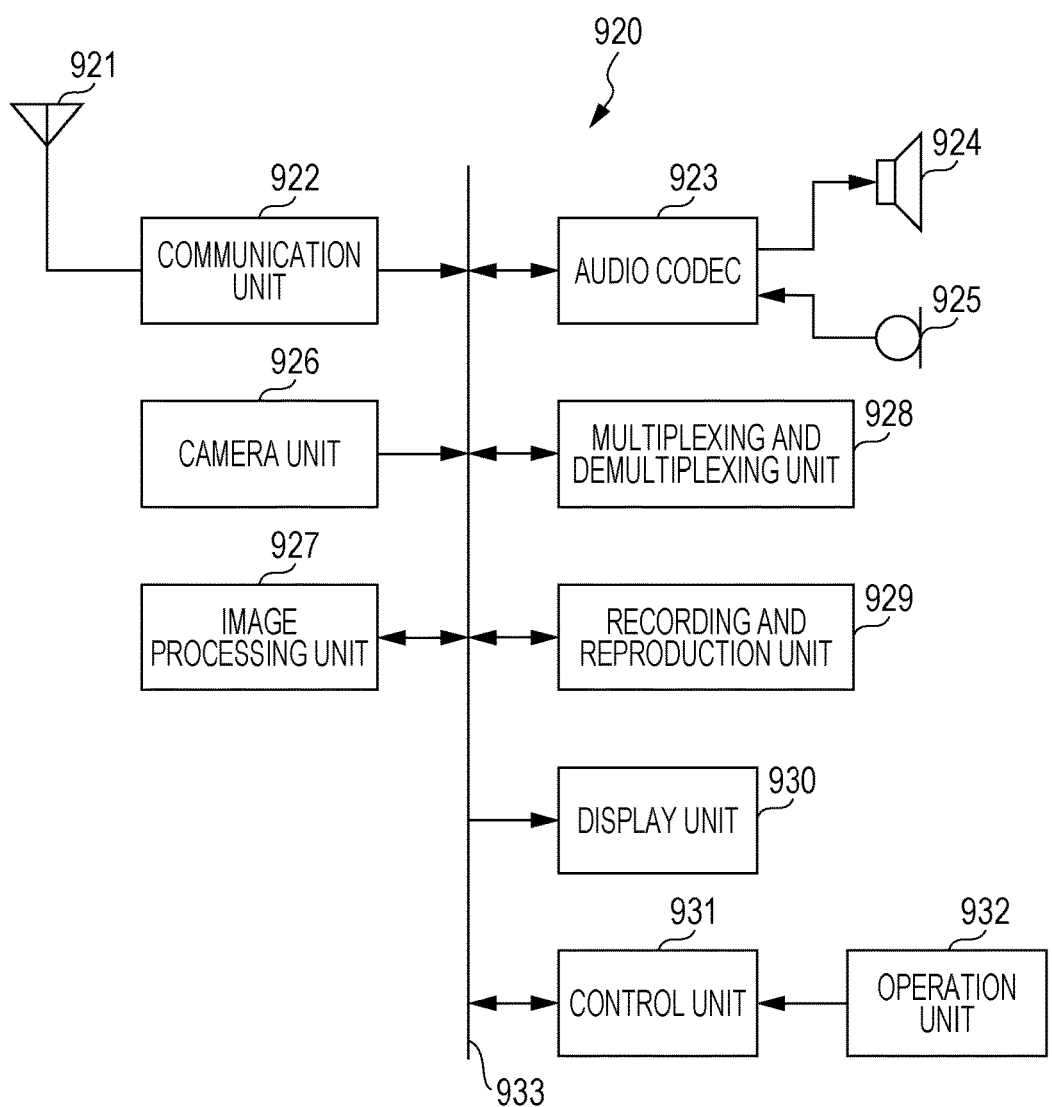
FIG. 12 is a diagram illustrating a schematic configuration example of a mobile telephone to which an embodiment of the present disclosure is applied.

FIG. 12 shows an example of a schematic configuration of the mobile telephone to which an embodiment of the present disclosure is applied. A mobile telephone 920 includes a communication unit 922, an audio codec 923, a camera unit 926, an image processing unit 927, a multiplexing and demultiplexing unit 928, a recording and reproduction unit 929, a display unit 930 and a control unit 931. These are connected to each other via a bus 933.

An antenna 921 is connected to the communication unit 922, and a speaker 924 and a microphone 925 are connected to the audio codec 923. Furthermore, the operation unit 932 is connected to the control unit 931.

The mobile telephone 920 performs various operations such as transmission and reception of audio signals, transmission and reception of electronic mail and image data, image photography and data recording in various modes such as an audio call mode and a data communication mode.

In the audio call mode, the audio signal, which is generated by the microphone 925, is converted into audio data and subjected to data compression by the audio codec 923, and the result is supplied to the communication unit 922. The communication unit 922 subjects the audio data to a modulation process, a frequency conversion process, or the like and generates the transmission signal. The communication unit 922 supplies the transmission signal to the antenna 921 and transmits the transmission signal to a base station (not shown).

The communication unit 922 subjects the received signal that is received by the antenna 921 to the amplification, the frequency conversion process, and the demodulation process and the like, and supplies the obtained audio data to the audio codec 923. The audio codec 923 subjects the audio data to data expansion and conversion to an analogue audio signal, and outputs the result to the speaker 924.

In the data communication mode, when performing mail transmission, the control unit 931 receives the character data that is input by the operation of the operation unit 932, and displays the characters that are input on the display unit 930. The control unit 931 generates the mail data based on the user commands and the like in the operation unit 932, and supplies the mail data to the communication unit 922. The communication unit 922 subjects the mail data to the modulation process, the frequency conversion process, and the like, and transmits the transmission signal that is obtained from the antenna 921. The communication unit 922 subjects the received signal that is received by the antenna 921 to the amplification, the frequency conversion process, the demodulation process, and the like, and restores the mail data. The mail data is supplied to the display unit 930, and the display of the mail content is performed.

Note that, the mobile telephone 920 can also cause the recording and reproduction unit 929 to store the received mail data on a recording medium. The storage medium is an arbitrary re-writable storage medium. Examples of the storage medium include semiconductor memory such as RAM and built-in flash memory, a hard disk, a magnetic disc, a magneto optical disc, an optical disc, a universal serial bus (USB) memory or removable media such as a memory card.

When transmitting image data in the data communication mode, the image data that is generated by the camera unit 926 is supplied to the image processing unit 927. The image processing unit 927 subjects the image data to the encoding process, and generates the encoded data.

The multiplexing and demultiplexing unit 928 multiplexes the encoded data that is generated by the image processing unit 927 and the audio data that is supplied from the audio codec 923 using a predetermined method and supplies the multiplexed data to the communication unit 922. The communication unit 922 subjects the multiplexed data to the modulation process, the frequency conversion process, and the like, and transmits the obtained transmission signal from the antenna 921. The communication unit 922 subjects the received signal that is received by the antenna 921 to the amplification, the frequency conversion process, the demodulation process, and the like, and restores the multiplexed data. The multiplexed data is supplied to the multiplexing and demultiplexing unit 928.

The multiplexing and demultiplexing unit 928 subjects the multiplexed data to the demultiplexing, and supplies the encoded data to the image processing unit 927 and the audio data to the audio codec 923. The image processing unit 927 subjects the encoded data to the decoding processes, and generates the image data. The image data is supplied to the display unit 930, and the display of the image that is received is performed. The audio codec 923 outputs the audio that is received by converting the audio data into an analogue audio signal, and supplying the analogue audio signal to the speaker 924.

In the mobile telephone device that is configured in this manner, the image processing unit 927 is provided with the function of the image processing device (the image processing method) of the present application. Therefore, it is possible to control the lighting of the input image with little computation.

Fifth Embodiment

Configuration Example of Recording and Reproduction Device

Figure 13:
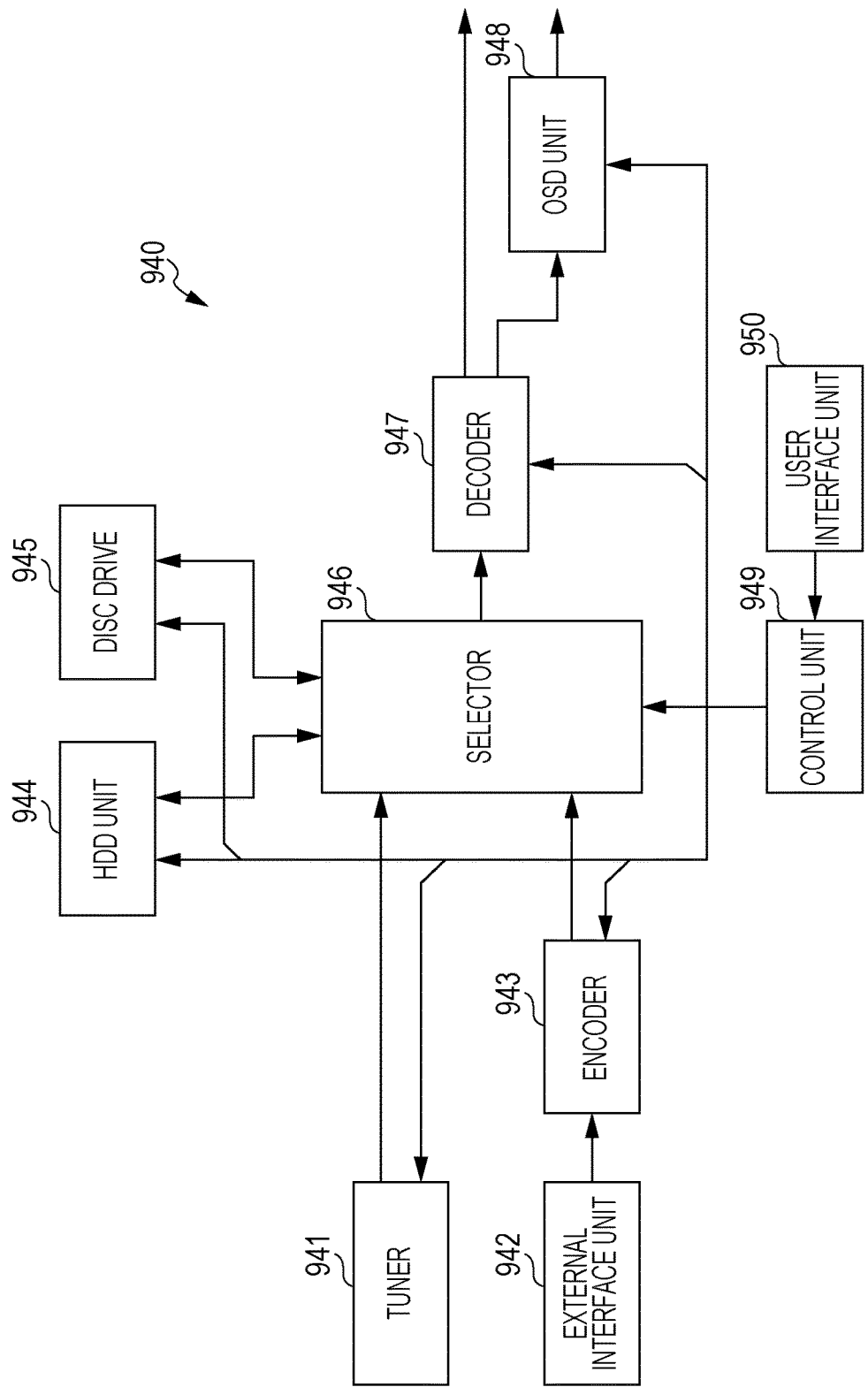
FIG. 13 is a diagram illustrating a schematic configuration example of a recording and reproduction device to which an embodiment of the present disclosure is applied.

FIG. 13 shows an example of a schematic configuration of the recording and reproduction device to which an embodiment of the present disclosure is applied. A recording and reproduction device 940 records audio data and video data of a broadcast show that is received, for example, on a recording medium, and provides a user with the data that is recorded at a timing that corresponds to a command of the user.

It is possible to cause the recording and reproduction device 940 to acquire the audio data and the video data from another device, for example, and to record the data onto the recording medium. Furthermore, the recording and reproduction device 940 can perform image display and audio output on a monitor device or the like by decoding and outputting the audio data and the video data that are recorded on the recording medium.

The recording and reproduction device 940 includes an a tuner 941, an external interface unit 942, an encoder 943, a hard disk drive (HDD) unit 944, a disc drive 945, a selector 946, a decoder 947, an on-screen display (OSD) unit 948, a control unit 949, and a user interface unit 950.

The tuner 941 selects a desired channel from a broadcast signal that is received by the antenna (not shown). The tuner 941 outputs an encoded bitstream, which is obtained by demodulating the received signal of the desired channel, to the selector 946.

The external interface unit 942 is configured to include at least one of an IEEE 1394 interface, a network interface unit, a USB interface, a flash memory interface, or the like. The external interface unit 942 is an interface for connecting to external devices, a network, a memory card, or the like, and performs data reception of the video data, the audio data, and the like that are recorded.

The encoder 943 performs encoding using a predetermined method when the video data and the audio data that are supplied from the external interface unit 942 are not encoded, and outputs the encoded bitstream to the selector 946.

The HDD unit 944 records content data such as video and audio, various programs, other data and the like on a built-in hard disk, and, during reproduction and the like, reads the recorded content from the hard disk.

The disc drive 945 performs recording and reproduction of a signal in relation to an optical disc that is mounted. Examples of the optical disc include a DVD disc (DVD-Video, DVD-RAM, DVD-R, DVD-RW, DVD+R, DVD+RM and the like), and a Blu-ray disc (registered trademark).

During recording of the video and the audio, the selector 946 selects the encoded bitstream from one of the tuner 941 and the encoder 943, and supplies the encoded bitstream to one of the HDD unit 944 and the disc drive 945. During reproduction of the video and the audio, the selector 946 supplies the encoded bitstream, which is output from the HDD unit 944 or the disc drive 945, to the decoder 947.

The decoder 947 subjects the encoded bitstream to a decoding process. The decoder 947 supplies the video data that is generated by performing the decoding process to the OSD unit 948. The decoder 947 outputs the audio data that is generated by performing the decoding process.

The OSD unit 948 generates the video data for displaying the menu screen and the like such as the item selection, multiplexes the video data with the video data that is output from the decoder 947 and outputs the result.

The user interface unit 950 is connected to the control unit 949. The user interface unit 950 is configured to include an operation switch, a remote control signal reception unit, and the like, and supplies an operation signal corresponding to a user operation to the control unit 949.

The control unit 949 is configured using a CPU, a memory, and the like. The memory stores the program that is executed by the CPU and the various data that is necessary for the CPU to perform the processes. The program that is stored in the memory is read out and executed by the CPU at a predetermined timing such as when the recording and reproduction device 940 starts up. By executing the program, the CPU controls each part such that the recording and reproduction device 940 performs an operation that corresponds to the user operation.

In a recording and reproduction device that is configured in this manner, the decoder 947 is provided with the function of the image processing device (the image processing method) of the present application. Therefore, it is possible to control the lighting of the input image with little computation.

Sixth Embodiment

Configuration Example of Imaging Device

FIG. 14 shows an example of the schematic configuration of an imaging device to which an embodiment of the present disclosure is applied. An imaging device 960 images an object, causes the display unit to display an image of the object, records the image on a recording medium as image data, and the like.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. A user interface unit 971 is connected to the control unit 970. Furthermore, the image data processing unit 964, the external interface unit 966, the memory unit 967, the media drive 968, the OSD unit 969, the control unit 970, and the like are connected to each other via a bus 972.

The optical block 961 is configured using a focus lens, an aperture mechanism or the like. The optical block 961 causes an optical image of the object to form on an imaging surface of the imaging unit 962. The imaging unit 962 is configured using a CCD or a CMOS image sensor, generates an electrical signal corresponding to the optical image using photoelectric conversion, and supplies the electrical signal to the camera signal processing unit 963.

The camera signal processing unit 963 subjects the electrical signal that is supplied from the imaging unit 962 to various camera signal processes such as knee correction, gamma correction, and color correction. The camera signal processing unit 963 supplies the post-camera signal processing image data to the image data processing unit 964.

The image data processing unit 964 subjects the image data that is supplied from the camera signal processing unit 963 to the encoding process. The image data processing unit 964 supplies the encoded data that is generated by performing the encoding process to the external interface unit 966 or the media drive 968. The image data processing unit 964 subjects the encoded data that is supplied from the external interface unit 966 or the media drive 968 to the decoding process. The image data processing unit 964 supplies the image data that is generated by performing the decoding process to the display unit 965.

The image data processing unit 964 multiplexes the display data, which is acquired from a process of supplying the image data that is supplied from the camera signal processing unit 963 to the display unit 965, or from the OSD unit 969, with the image data. The image data processing unit 964 supplies the result thereof to the display unit 965.

The OSD unit 969 generates the display data such as menu screens and icons that are formed of symbols, characters or graphics, and outputs the display data to the image data processing unit 964.

The external interface unit 966 is configured by a USB input-output terminal or the like, for example, and when performing printing of the image, is connected to a printer. A drive is connected to the external interface unit 966 as necessary, a removable medium such as a magnetic disc or an optical disc is appropriately mounted therein, and a computer program that is read out therefrom is installed, as necessary. Furthermore, the external interface unit 966 includes a network interface that is connected to a predetermined network such as a LAN or the Internet. The control unit 970, for example, reads the encoded data from the media drive 968 according to the commands from the user interface unit 971, and is capable of supplying the encoded data from the external interface unit 966 to another device that is connected via the network.

The control unit 970 acquires the encoded data and the image data that are supplied from another device via the network via the external interface unit 966, and is capable of supplying the encoded data and the image data to the image data processing unit 964.

Usable examples of the recording medium that is driven by the media drive 968 include a magnetic disc, a magneto optical disc, an optical disc, and an arbitrary removable medium that can be read and written such as semiconductor memory. The type of removable media of the recording medium is also arbitrary, and may be a tape device, a disc, or a memory card. Naturally, the type may be a contactless integrated circuit (IC) card or the like.

The media drive 968 and the recording medium may be integrated, for example, and be configured of a non-transportable recording medium such as a built-in hard disk drive or a solid state drive (SSD).

The control unit 970 is configured using a CPU. The memory unit 967 stores the program that is executed by the control unit 970, and the various data that is necessary for the control unit 970 to perform the processes. The program that is stored in the memory unit 967 is read out and executed by the control unit 970 at a predetermined timing such as when the imaging device 960 starts up. By executing the program, the control unit 970 controls each part such that the imaging device 960 performs an operation that corresponds to the user operation.

In the imaging device that is configured in this manner, the image data processing unit 964 is provided with the function of the image processing device (the image processing method) of the present application. Therefore, it is possible to control the lighting of the input image with little computation.

Note that, the effects disclosed in the present specification are merely examples, embodiments are not to be limited thereto, and other effects may also be present.

The embodiments of the present disclosure are not limited to the embodiments described above, and various modifications may be made within the scope not departing from the main concept of the present disclosure.

For example, in the present disclosure, it is possible to adopt a cloud computing configuration in which one function is distributed, shared and processed by a plurality of devices via a network.

In addition to executing each of the steps described in the flowchart described above using one device, it is possible to distribute and execute the steps over a plurality of devices.

Furthermore, when a plurality of processes are contained in one step, in addition to executing the processes on one device, it is possible to distribute and execute the plurality of processes contained in that one step on a plurality of devices.

Note that, the present disclosure may adopt the following configurations.

(1) An image processing device, including a calculation unit which calculates a luminosity of an environmental light of an image for each region based on an overall average value which is an average value of the luminosity of all pixels forming the image of an object and region average values which are the average values of the luminosity of the pixels for each region that is obtained by dividing the image, and a generation unit which generates a virtual captured image which is an image of the object when the object is illuminated with light from a predetermined position based on the luminosity of the environmental light for each of the regions of the image that is calculated by the calculation unit and the image.

(2) The image processing device according to (1), in which the calculation unit calculates, for each of the regions, a difference between the region average value of the region and the overall average value as the luminosity of the environmental light of the image.

(3) The image processing device according to (1) or (2), further including a determination unit which determines a gain by which to multiply the luminosity of the environmental light for each of the regions of the image that is calculated by the calculation unit based on the predetermined position and the region average values, and a prediction unit which predicts a difference between the luminosity of the environmental light of the virtual captured image and the luminosity of the environmental light of the image for each of the regions by multiplying the gain that is determined by the determination unit with the luminosity of the environmental light for each of the regions of the image that is calculated by the calculation unit, in which the generation unit generates the virtual captured image based on the differences that are predicted by the prediction unit and the image.

(4) The image processing device according to (3), in which the determination unit corrects the gain based on the average value of the region average values of region groups that are formed of a plurality of adjacent regions, and in which the prediction unit predicts the difference for each of the regions by multiplying the gain that is corrected by the determination unit with the luminosity of the environmental light for each of the regions of the image.

(5) The image processing device according to (3) or (4), further including a conversion unit which generates the difference for each pixel by subjecting the differences for each of the regions that are predicted by the prediction unit to linear interpolation, in which the generation unit generates the virtual captured image based on the differences for each of the pixels that are generated by the conversion unit and the image.

(6) The image processing device according to any one of (1) to (5), further including an input unit which receives an input of the predetermined position performed by a user.

(7) An image processing method performed by an image processing device, the method including calculating a luminosity of an environmental light of an image for each region based on an overall average value which is an average value of the luminosity of all pixels forming the image of an object and region average values which are the average values of the luminosity of the pixels for each region that is obtained by dividing the image, and generating a virtual captured image which is an image of the object when the object is illuminated with light from a predetermined position based on the luminosity of the environmental light for each of the regions of the image that is calculated by the calculating process and the image.

(8) A program for causing a computer to function as a calculation unit which calculates a luminosity of an environmental light of an image for each region based on an overall average value which is an average value of the luminosity of all pixels forming the image of an object and region average values which are the average values of the luminosity of the pixels for each region that is obtained by dividing the image, and a generation unit which generates a virtual captured image which is an image of the object when the object is illuminated with light from a predetermined position based on the luminosity of the environmental light for each of the regions of the image that is calculated by the calculation unit and the image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
   circuitry configured to:
      display a first image;
      receive a user input at a second position in the first image;
      calculate a luminosity of environmental light for each region of a plurality of regions of the first image of an object based on:
         an overall average value of luminosity of a plurality of pixels of the first image of the object, and
         a plurality of region average values,
         wherein the plurality of region average values are average values of luminosity of pixels, of the plurality of pixels, for each region of the plurality of regions;
      determine a gain for multiplication with the calculated luminosity of the environmental light for each region of the plurality of regions of the first image; and
      generate a second image of the object in which the object is illuminated with light from a first position in the second image based on the user input at the second position in the first image,
         wherein the first position in the second image corresponds to the second position in the first image, and
         wherein the second image is generated based on the multiplication of the gain with the calculated luminosity of the environmental light for each region of the plurality of regions of the first image; and
      display the second image.

2. The image processing device according to claim 1, wherein the circuitry is further configured to calculate, for each region of the plurality of regions, a first difference between:
   each region average value, of the plurality of region average values, for respective each region of the plurality of regions and the overall average value, and wherein the calculated luminosity of the environmental light of the first image is based on the first difference for each region of the plurality of regions.

3. The image processing device according to claim 1, wherein the calculated luminosity of the environmental light for the plurality of regions is based on the second position and the plurality of region average values; and
wherein the circuitry is further configured to:
predict, based on the multiplication of the gain with the luminosity of the environmental light for each region of the plurality of regions of the first image, a second difference between luminosity of the environmental light of the second image and the luminosity of the environmental light for each region of the plurality of regions of the first image; and
generate the second image based on the second difference.

4. The image processing device according to claim 3, wherein the circuitry is further configured to:
correct the gain based on an average value of the plurality of region average values of a plurality of region groups,
wherein the plurality of region groups comprises a plurality of adjacent regions, and
wherein the plurality of adjacent regions are based on the plurality of regions of the first image; and
predict the second difference for each region of the plurality of regions by multiplication of the corrected gain with the luminosity of the environmental light for each region of the plurality of regions of the first image.

5. The image processing device according to claim 3, wherein the circuitry is further configured to:
generate a third difference for the plurality of pixels by linear interpolation of the second difference for each region of the plurality of regions,
generate the second image based on the third difference for the plurality of pixels.

6. The image processing device according to claim 1, wherein the first position is a center position of the second image.

7. The image processing device according to claim 1, wherein the first position is a rightmost position of the second image.

8. The image processing device according to claim 1, wherein the first image of the object is a captured image in which the object is illuminated with the environmental light at a third position, wherein the third position is different from the second position, and
wherein the environmental light is a light source at a time of capture of the first image.

9. The image processing device according to claim 1, wherein the user input is a finger tap on a display device where the first image is displayed.

10. An image processing method, comprising:
in an image processing device:
receiving a user input at a second position in a first image that is being displayed;
calculating a luminosity of environmental light for each region of a plurality of regions of the first image of an object based on: an overall average value of luminosity of a plurality of pixels of the first image of the object, and region average values,
wherein the region average values are average values of luminosity of pixels, of the plurality of pixels, for each region of the plurality of regions;
determining a gain for multiplication with the calculated luminosity of the environmental light for each region of the plurality of regions of the first image; and
generating a second image of the object in which the object is illuminated with light from a first position in the second image based on the user input at the second position in the first image,
wherein the first position in the second image corresponds to the second position in the first image, and
wherein the second image is generated based on the multiplication of the gain with the calculated luminosity of the environmental light for each region of the plurality of regions of the first image; and
wherein the second image is to be displayed in response to the user input.

11. A non-transitory computer-readable medium, having stored thereon, computer-executable instructions, which when executed by an image processing device, cause the image processing device to execute operations, the operations comprising:
displaying a first image;
receiving a user input at a second position in the first image;
calculating a luminosity of environmental light for each region of a plurality of regions of the first image of an object based on: an overall average value of luminosity of a plurality of pixels of the first image of the object, and region average values,
wherein the region average values are average values of luminosity of pixels, of the plurality of pixels, for each region of the plurality of regions;
determining a gain for multiplication with the calculated luminosity of the environmental light for each region of the plurality of regions of the first image; and
generating a second image of the object in which the object is illuminated with light from a first position in the second image based on the user input at the second position in the first image,
wherein the first position in the second image corresponds to the second position in the first image, and
wherein the second image is generated based on the multiplication of the gain with the calculated luminosity of the environmental light for each region of the plurality of regions of the first image; and
displaying the second image.

12. An image processing device, comprising: circuitry configured to:
display a first image;
receive a user input at a second position in the first image;
calculate a luminosity of environmental light for each region of a plurality of regions of the first image of an object based on: an overall average value of luminosity of a plurality of pixels of the first image of the object, and a plurality of region average values,
wherein the plurality of region average values are average values of luminosity of pixels, of the plurality of pixels, for each region of the plurality of regions;
determine a gain for multiplication with the calculated luminosity of the environmental light for each region of the plurality of regions of the first image;
generate a second image of the object in which the object is illuminated with light from a first position in the second image based on the user input at the second position in the first image, wherein the calculated luminosity of the environmental light for the plurality of regions is based on the second position and the plurality of region average values, and wherein the first position in the second image corresponds to the second position in the first image; and predict, based on the multiplication of the gain with the luminosity of the environmental light for each region of the plurality of regions of the first image, a second difference between luminosity of the environmental light of the second image and the luminosity of the environmental light for each region of the plurality of regions of the first image, wherein the second image is generated based on the second difference; and display the second image.

* * * * *